(12) United States Patent
Maciel

(10) Patent No.: US 6,826,622 B2
(45) Date of Patent: Nov. 30, 2004

(54) METHOD OF TRANSFERRING DATA BETWEEN MEMORIES OF COMPUTERS

(75) Inventor: Frederico Buchholz Maciel, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 695 days.

(21) Appl. No.: 09/918,639

(22) Filed: Aug. 1, 2001

(65) Prior Publication Data

US 2002/0095471 A1 Jul. 18, 2002

(30) Foreign Application Priority Data

Jan. 12, 2001 (JP) .................................. 2001-004399

(51) Int. Cl.[7] .......................... G06F 15/16; H04L 12/00
(52) U.S. Cl. ...................... 709/238; 709/232; 709/213; 709/216
(58) Field of Search ............................... 709/213, 214, 709/216, 232, 238, 239

(56) References Cited

FOREIGN PATENT DOCUMENTS

JP          11-328134          5/1998

OTHER PUBLICATIONS

W. Richard Stevens, UNIX Network Programming, "Berkeley Sockets," Library of Congress Cataloging, pp. 258–279.
Virtual Interface Architecture Specification, Draft Revision 1.0, 1997 Compaq Computer Corp, Intel Corporation, Microsoft Corporation, pp. 1–82.
Steven H. Rodriques, Thomas E. Anderson, David E. Culler, "High–Performance Local Area Communication With Fast Sockets," Computer Science Division, University of California at Berkeley, pp. 1–18.
Hemal V. Shah, Calton Pu, and Rajesh S. Madukkarumukumana, :"High Performance Sockets and RPC over Virtual Intervace (VI) Architecture," Server Architecture Lab, Intel Corporation, pp. 91–107.
D.A. Solomon, Winsock Direct Specification, Inside Windows NT, Second Edition, Microsoft Press, 1998. pp. 1–54.
MPI: A Message–Passing Interface Standard, Jun. 12, 1995, University of Tennessee, Knoxville, Tennessee, pp. 1–32.
Rossen Dimitrov and Anthony Skjellum, Efficient MPI for Virtual Interface (VI) Architecture, MPI Software Technology, Inc., pp. 1–7.
C. Sapuntzakis, Randy Haagens, Efri Zeidner, Paul Von Stamwitz and Luciano Dalle Ore, SCSI (Internet SCSI), pp. 1–61.

Primary Examiner—Jack Lane
(74) Attorney, Agent, or Firm—Reed Smith LLP; Stanley P. Fisher, Esq.; Juan Carlos A. Marquez, Esq.

(57) ABSTRACT

In a communicating method between data processing apparatuses using the Sockets API or the MPI API, the apparatus on the receiving side informs the apparatus on the sending side of a data length threshold, which makes the apparatus on the sending side to decide between sending data to a pre-registered pre-allocated buffer on the apparatus on the receiving side, or having the memory region that is the final destination of the data transfer registered and then sending the data to this memory region. When the length of the data to be sent does not exceed the threshold, sending to the pre-allocated buffer is selected, and the data transfer operation is completed by copying the received data from the pre-allocated buffer to the final destination of this transfer. In case the length of the data to be sent exceeds the threshold, the data is sent directly to the final destination of this transfer.

9 Claims, 13 Drawing Sheets

METHOD OF TRANSFERRING DATA BETWEEN MEMORIES OF COMPUTERS

BACKGROUND OF THE INVENTION

1. Field of the Invention

The present invention concerns to methods of communicating data between computers in a computer system having a plurality of computers or data processing equipment connected through a communication network. More particularly, the invention consists of a method of sending/receiving data between memories of computers on a network in a which the hardware has the capability of transferring data between the memories of these computers.

2. Description of the Related Art

The TCP/IP protocol is used in the overwhelming majority of communications between computers, in particular in the communications in the Internet or in intranets. Since TCP/IP processing is not executed by the application, but is executed by the operating system, in order that the application perform communication using TCP/IP it uses an API (Application Programming Interface: the set of functions which an application calls in order to use a certain function of a computer or an operating system) called "Sockets API" (refer to the book by W. Richard Stevens, "UNIX Network Programming", Prentice Hill, U.S.A., 1990, ISBN 0-13-949876-1).

An example of the software structure of a host which performs communication using the TCP/IP protocol is shown in FIG. 1. The host 10 performs communication using the network 18. The kernel 120 of the operating system of the host 10 executes protocol processing 121 of TCP/IP and controls the communication hardware 11 in order to perform communication. The program 101 of the application 100 uses the Sockets API 90 to call the library 110. The library executes the system call 111 and calls the kernel 120. The kernel 120 sends and receives data 102 of the application 100 through the socket buffer 122.

Since protocol processing 121 in TCP/IP communication involves a large amount of processing, and the system call 111 and the copy between the data 102 and the socket buffer 122 result in overhead, these processings limit the communication performance in some cases. For this reason, computer systems requiring high communication performance, such as supercomputers or workstation clusters, employ networks which can transfer data between applications without performing protocol processing, system calls and data copies and also bypassing the kernel. In the present specification, henceforth, this communication method will be referred to as "high-speed communication" for short, when applicable. As an example of high-speed communication, there is the VIA (refer to the specification by Compaq Computer Corp., Intel Corp., Microsoft Corp., "Virtual Interface Architecture Specification, Draft Revision 1.0", Dec. 4, 1997, http://www.Viarch.org). Since the functionality of high-speed communication is different from that of TCP/IP, their respective APIs are also different.

An example of the software structure of a host employing high-speed communication is shown in FIG. 2. The program 104 of the application 103 calls the high-speed communication library 130 by using the high-speed communication API 91 to send and receive data 105. By executing the communication processing 131 of the high-speed communication library 130, the high-speed communication hardware 12 is activated bypassing the kernel 120 to send and receive the data 105 through the high-speed communication network 19. When sending and receiving data by high-speed communication, two processings are required: the processing of inspecting whether or not the application 103 has the permission to access the data 105 which it wants to send or receive, and the processing to convert the virtual addresses which were specified by the application 103 into the physical addresses which are used by the high-speed communication hardware 12. For this reason the application 103, before sending and receiving data, calls the high-speed communication library 130 to register the data 105 to be sent and received (the registered data is shown in the form of a rectangle having rounded corners). The kernel performs the registration processing 123 in response to the call 132 of the high-speed communication library. As a result, it is possible to verify if the application 103 has access permission and, when it has the address conversion is performed and its result is registered in the memory registration table 13. The high-speed communication hardware 12 performs both the verification of the access permissions and the address conversion by using this memory registration table 13.

Since the high-speed communication API 91 is different from the Sockets API 90, in order that an application 100 employing the Sockets API 90 may use high-speed communication, this application 100 must be rewritten to use the high-speed communication API 91. Since this rewriting is difficult to do, many applications will remain unchanged, still using the Sockets API, thus they won't be able to take advantage of the high performance of high-speed communication. In order to solve this problem, a communication method called "Fast Sockets", shown in FIG. 3, is employed. The Fast Sockets library 140 receives the call made from the application 100 through the sockets API 90 to execute the emulation processing 141 to communicate using high-speed communication. For this reason, it is possible to take advantage of the high performance of high-speed communication while keeping application compatibility. As examples of Fast Sockets, there is the method disclosed in JP-A-11-328134, the method by Berkely University (refer to the paper by S. H. Rodrigues, T. E. Anderson, D. E. Culler, "High-Performance Local Area Communication With Fast Sockets", Proceedings of the USENIX'97, 1997, pp. 257 to 274), the method by Shah et al. (refer to the paper by H. V. Shah, C. Pu, R. S. Madukkarumukumana, "High Performance Sockets and RPC over Virtual Interface (VI) Architecture", Proceedings of CANPC'9, 1991), Winsock Direct made by Microsoft Corp. (refer to the article "Winsock Direct Specifications, on the Microsoft Windows Driver Development Kit (DDK)".

When data 102 of the application 100 is registered (800) to perform communication, a processing overhead (132, 123) of the buffer registration 800 occurs. When the data length is long, this overhead (132, 123) is shorter than the communication time, so high communication performance is obtained. On the other hand, when the data length is short, this overhead is longer than the communication time, so the communication performance is reduced. In order to solve this problem, the Fast Sockets library 140 on its initialization allocates a pre-allocated buffer 142 and registers (801). When communicating short data 102, this data is not registered, but is copied to the pre-allocated buffer 142 to perform the communication. In this case, despite the overhead of the copy, since the data length is short, and this overhead is small when compared to the registration processing, high performance can be obtained. While the pre-allocated buffer 142 is usually separated into buffers for sending and buffers for receiving data, these buffers are collectively shown in the form of one buffer 142 in FIG. 3 and the following figures of the software structure.

Above, the TCP/IP communication and the Fast Sockets have been described. While applications generally use TCP/IP communication (and as a result, the Sockets API), scientific computing applications use APIs such as MPI (Message Passing Interface Forum: refer to the standard "MPI: A Message-Passing Interface Standard", 1995). Since MPI is independent of the computer architecture, when implementing MPI over high-speed communication, the calls made to the MPI API are mapped onto the calls of the high-speed communication API 91. As an example of a product implementing this mapping, there is MPI-Pro made by MPI Software Technology Inc. (refer to the paper by R. Dimitrov and A. Skjellum., "Efficient MPI for Virtual Interface (VI) Architecture", Proceeding of the 1999 International Conference on Parallel and Distributed Processing Techniques and Applications, Las Vegas, Nev., U.S.A., Jun. 1999, Vol.6, pp. 3094 to 3100). The method to implement MPI is shown in FIG. 4. In this figure the program 107 of the application 106 using MPI transfers data 108 by using the MPI API 92. The MPI library 150 performs emulation 151 to do the mapping described above. Since the structure of the MPI implementation (refer to FIG. 4) is the same as that of the Fast Sockets implementation (refer to FIG. 3), the problems in the communication in both MPI and Fast Sockets are also similar. Unless otherwise indicated, the methods explained for Fast Sockets are also applicable to MPI. Conversely, the methods explained for MPI are also to applicable Fast Sockets.

The present invention has been made in order to solve the following five problems of communication libraries such as the Fast Sockets library and the MPI library (hereinafter, these libraries will be referred to as "the emulation libraries" for short, when applicable).

The first problem is as follows. In prior art, the sending host selects, on the basis of the data length, the optimal one in the sending host between communication in which the data 102 or 108 is registered (800, 808), and communication in which the data is copied to the pre-allocated buffer 142, 152. However, the seconding host does not take into consideration which of them is optimal at the receiving host. Consequently, the reception processing performance of the receiving host is reduced.

he second problem is as follows. In the case where the call of data reception is executed ahead of receiving data in the receiving host, the receiving host can register (800) the memory region of the data to be received 102, 108 and notify the other endpoint on the data transfer of both of the address and the data length of this region. However, if the sending host receives this notification after having started sending this data, this notification becomes of no use, which results in processing overhead in the sending host and in the receiving host. As a result, since the network bandwidth is being taken by these notifications, the processing performance of the overall system is reduced.

The third problem is as follows. In prior art the two data transfer methods, i.e., writing the data by the sending host onto the receiving host and reading out the data by the receiving host from the sending host, and the four combinations of the communication by registering the data 102, 108 (800, 808), and by copying the data to the pre-allocated buffer, 142 and 152, respectively on both the receiving host and the sending host, for a grand total of eight combinations, can not be utilized simultaneously. For this reason, the performance of networks which realize high-speed communication can not be fully used.

The fourth problem is as follows. In prior art, the same communication method is used irrespective of the other party on the communication. However, in the future, it is conceivable that the other party on the communication is not the computer such as a server, but is a storage apparatus which uses the iSCSI (refer to the draft by J. Satran et alli., "iSCSI (Internet SCSI)", Internet Engineering Task Force Internet-Draft draft-atran-iscsi-01.Txt, Jul. 10, 2000) (In the present invention, a communicating apparatus is referred to as a "host" irrespective of its kind). Since for a storage apparatus, the memory quantity which can be used in the pre-allocated buffer 142 is limited when compared to a computer and hence the processing performance may be poor in some cases, only same of the eight combinations described in the above-mentioned problem are efficient. Not limiting the communication method in accordance to the characteristics of the other party on the communication results, for example, in the case where the other party on the communication is a storage apparatus, the amount of memory required for this apparatus is increased, the sending and reception processing becomes complicated, the processing power required for the apparatus is increased, and thus the cost is increased.

The fifth problem is as follows. In prior art, when establishing a TCP/IP connection, the pre-allocated buffer 142, 152 is allocated, and in the communication after this, the characteristics of the buffer like its length are not changed. For this reason, the buffer amount cannot be adapted to the characteristics of this TCP/IP connection. For example, not increasing the size of the buffer when necessary can reduce performance. Also, memory regions which are registered (801, 809), as the pre-allocated buffer 142, 152 can not be swapped-out since it is the source/destination from/onto which the data is sent/received, and hence occupies the main memory. For this reason, not reducing the size of the buffer can reduce performance since this reduces the amount of memory which can be used by other applications.

SUMMARY OF THE INVENTION

In the light of the foregoing, the present invention has been made in order to solve the above-mentioned problems associated with the prior art, and it is therefore one object of the present invention to provide a data communication method by which the selection on the sending side of one of two kinds of data transfer operations, i.e., the operation of receiving data on the recerving side through a pre-allocated buffer and the operation of receiving data in memory region (s) registered for this data transfer is suitably done, thereby lowering the reception processing overhead on the receiving side.

It is another object of the present invention to provide a data communication method which is capable of reducing the overhead of the processing required to register memory region(s) for a specific data reception operation and to notify the sending side of its (their) reception address(es).

Other objects of the present invention will be made clear from the description of the preferred embodiments.

On a typical aspect of the present invention, it provides a communication method wherein a host on the receiving side notifies in advance a host on the sending side of the data length threshold which is used to select one between the data transfer with a pre-allocated buffer on the receiving side as the destination and the data transfer with the target memory region as the destination. When performing this specific data transfer, the host on the sending side performs the data transfer with the target memory region as the destination if the transfer data length exceeds the above-mentioned threshold. In this case, in the host on the receiving side is required to register the target memory region for this specific data transfer in the communication hardware. On the other hand, if the transfer data length does not exceed the above-mentioned threshold, then the host on the sending side performs the data transfer with the pre-allocated buffer as the destination. In this case, since this buffer was allocated when starting the communication between the hosts (or on a similar timing), the registration of the memory region that is the final destination of the transfer in the communication hardware is not required, it is only required to copy the data from the pre-allocated buffer to this final destination.

Which is the largest between the overhead of the registration of the memory region that is the final destination of the transfer and the overhead of the data copy from the buffer is the longest depends on the transfer data length, and also on the characteristics of the receiving host, and hence can not be judged by the sending side host. In the above-mentioned aspect, since the threshold for this selection is reported from the receiving host to the sending host, the selection of the transfer protocol can be suitably done.

In another aspect of the present invention, it provides a data communication method wherein a receiving host registers memory region(s) in which the specific data is to be received, and the efficiency of notifying the sending host of their address(es) is measured for a fixed period of time, and when the measured efficiency is low, the processing of notifying the sending host of these address(es) is restrained.

BRIEF DESCRIPTION OF THE DRAWINGS

The above and other objects as well as advantages of the present invention will become clear by the following description of the preferred embodiments of the present invention with reference to the accompanying drawings wherein.

DETAILED DESCRIPTION OF THE PREFERRED EMBODIMENTS

The preferred embodiments of the present invention will hereinafter be described in detail with reference to the accompanying drawings.

<<Method of Solving First Problem>>

Figure 1:
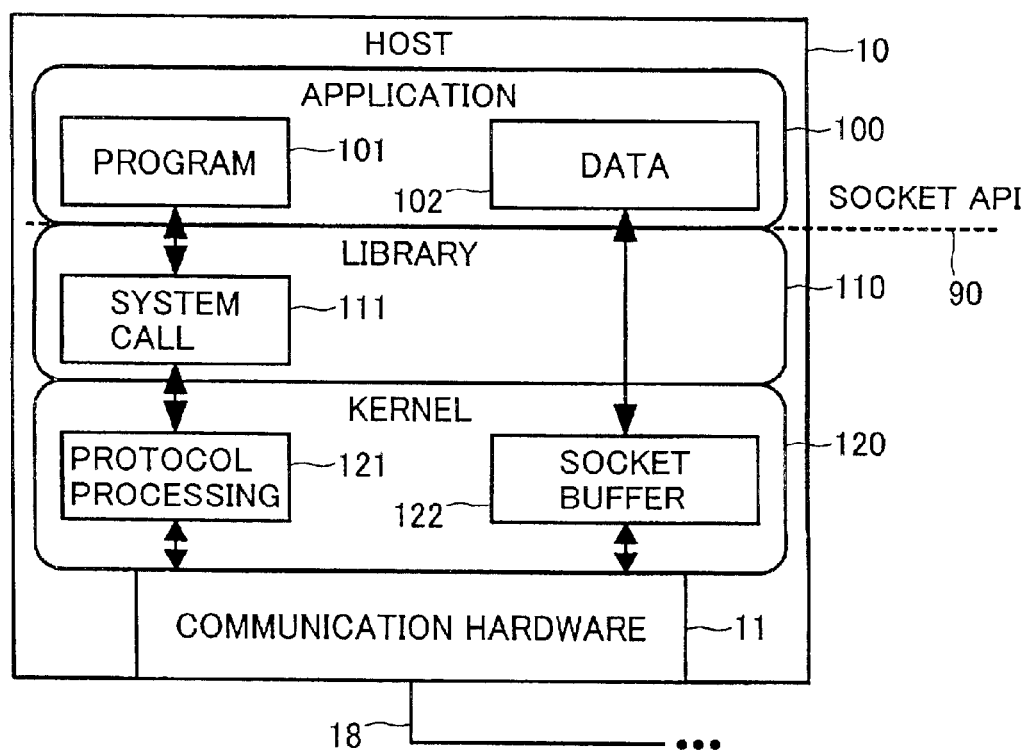
FIG. 1 is a block diagram showing the software structure of a host performing communication using the TCP/IP protocol.
Figure 2:
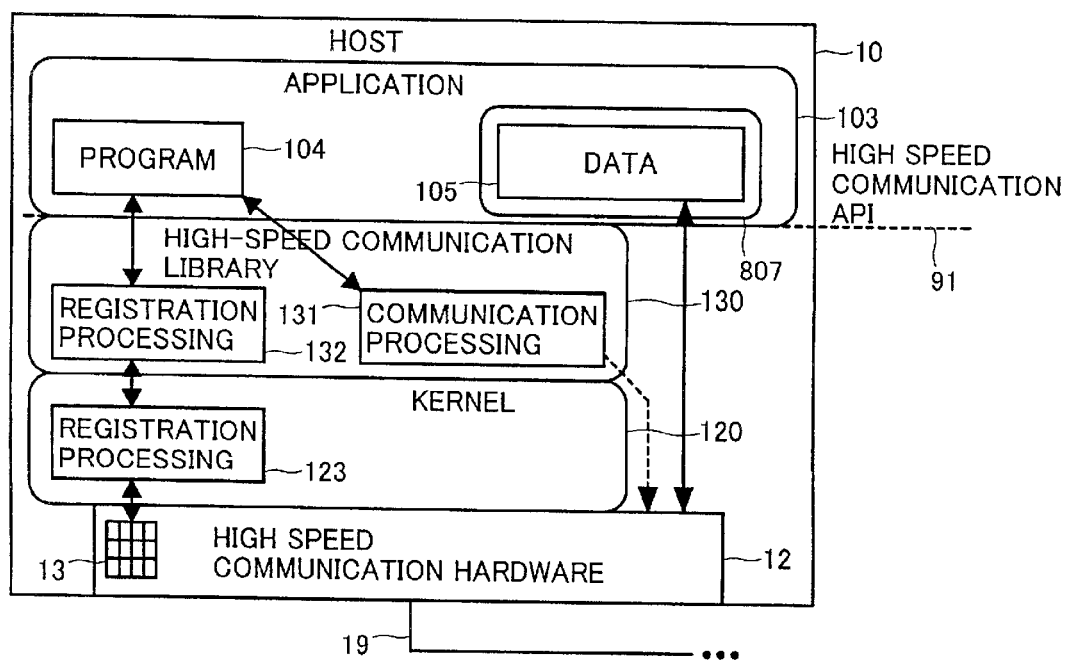
FIG. 2 is a block diagram showing the software structure of a host performing communication using high-speed communication.
Figure 3:
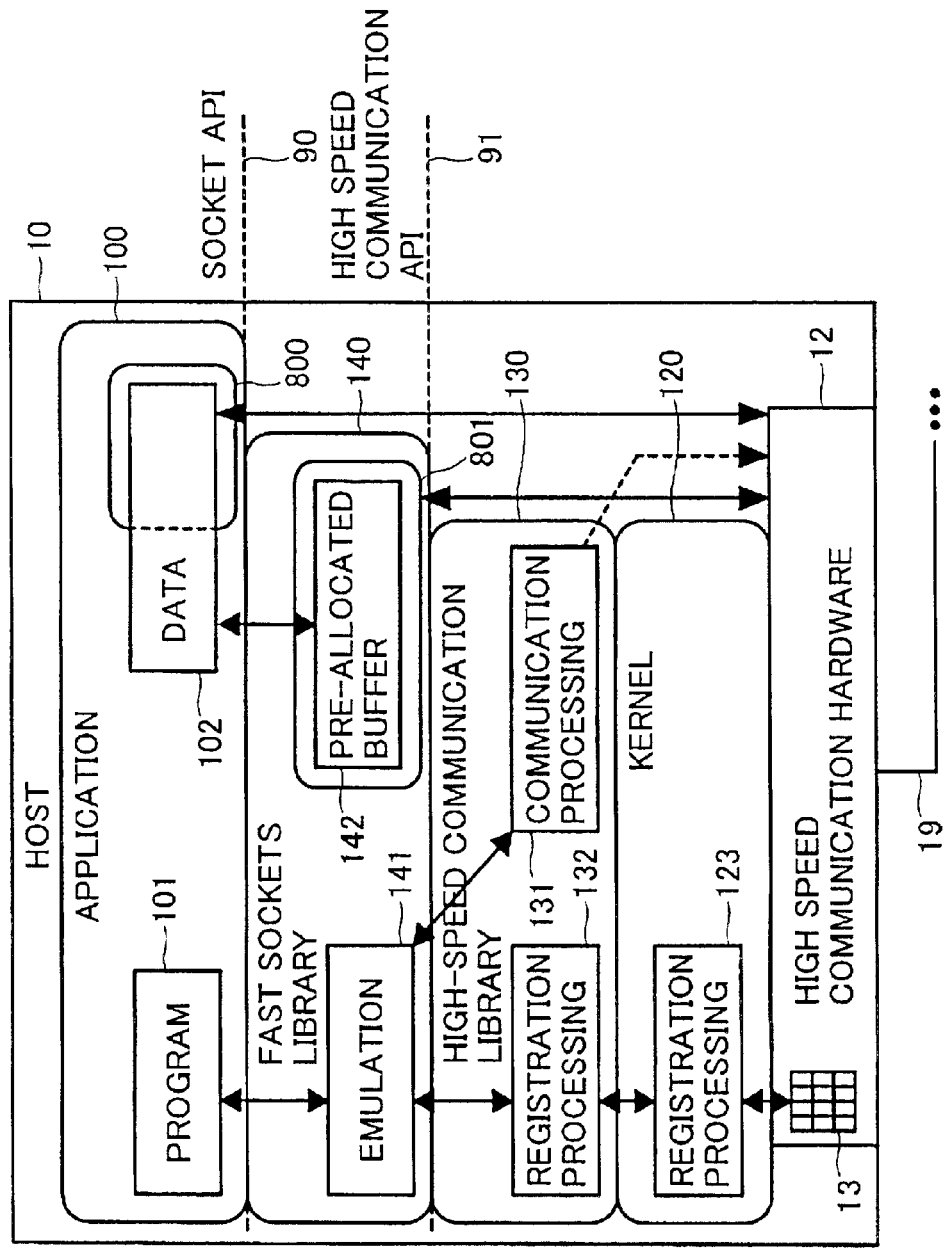
FIG. 3 is a block diagram showing the software structure of a host performing communication using Fast Sockets.
Figure 4:
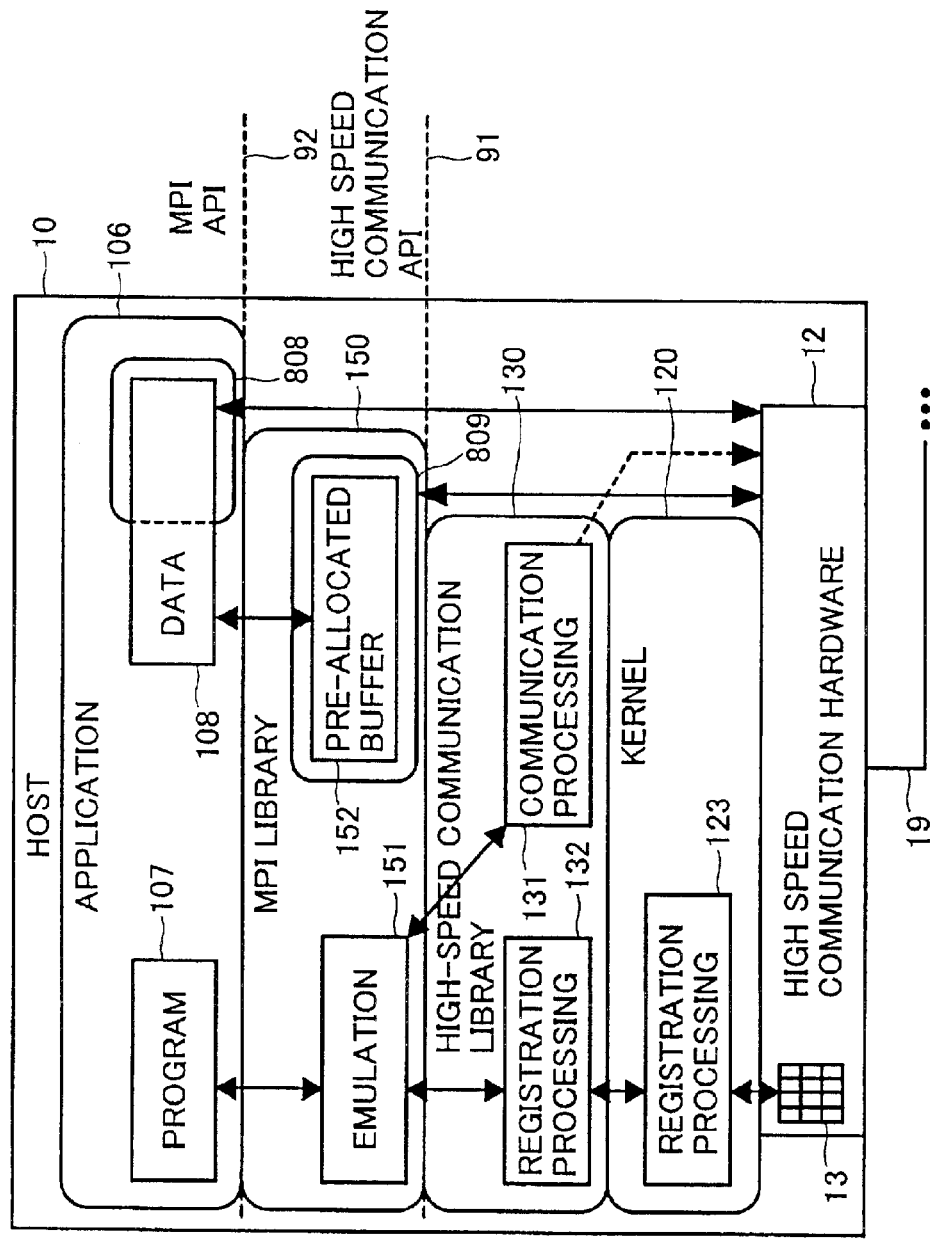
FIG. 4 is a block diagram showing the software structure of a host performing communication using an MPI.
Figure 5:
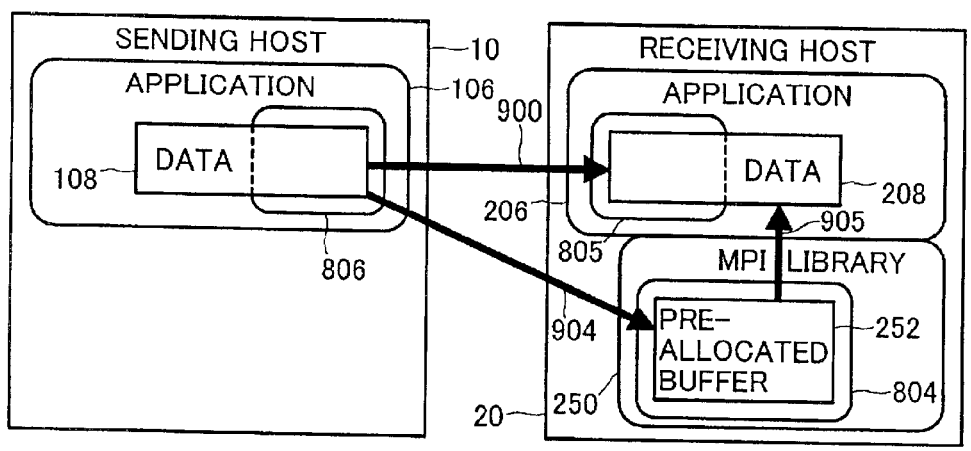
FIG. 5 is a block diagram useful in explaining the communication method of MPI-Pro.

For the description of the method of solving the first problem, first of all, the prior art will be described below. The communication method of MPI-Pro is shown in FIG. 5 (To make this and the following figures easier to understand, only the applications 100 and 106, and the emulation libraries 140 and 150 of FIG. 3 and FIG. 4 are shown. Both hosts 10 and 20 have the same software structure. Also, only one-way data transfer is shown, the host one the left side being the sending host 10, and the host on the right side being receiving host 20). MPI-Pro does not utilize a pre-allocated buffer on the sending side, but sends directly the data 108 from the application 106. In all data transfers the sending host 10 writes data onto the receiving host 20. When the data length is long, the data 108 is directly sent to the data 208 of the application 206 (indicated by the arrow 900), while when the data length is short, the data is sent to the pre-allocated buffer 252 of the receiving host 20 (indicated by the arrow 904). In this case, the host which determines to which of them the data is to be sent is the sending host 10.

In the case of a supercomputer, since usually the hosts 10 and 20 are identical, the sending host 10 can decide which is the best alternative between sending data to the application data 208 and the pre-allocated buffer 252 of the receiving host 20. However, in the case of a system in which the hosts 10 and 20 are different as in a workstation cluster running Fast Sockets and/or MPI, since the time required for memory registration (132, 123) and the memory copy performance are different depending on the host, an accurate decision can not be made by only the sending host 10. If this decision is mistaken, then the performance of the reception processing is reduced and, consequently, the performance of the overall system that includes the sending host 10 and the receiving host 20 is reduced.

Above, the prior art has been described. In the present invention, in order to solve this problem, the receiving host notifies the sending host of the transfer data length threshold which is used to determine which between communication by doing memory registration (805) and communication through the pre-allocated buffer 252 is optimal. The timing of the notification corresponds to a time point when the hosts 10 and 20 carrying out the communication have established the connection of the socket using the Sockets API 90 in the case of Fast Sockets, and to the initialization of the MPI libraries 150 and 250 in the case of MPI. This timing will be referred to hereinafter as "the communication start".

Figure 6A:
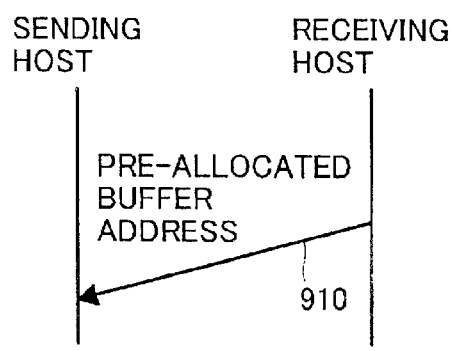
FIG. 6A is a communication flow chart useful in explaining the address notification when starting the conventional communication.
Figure 6B:
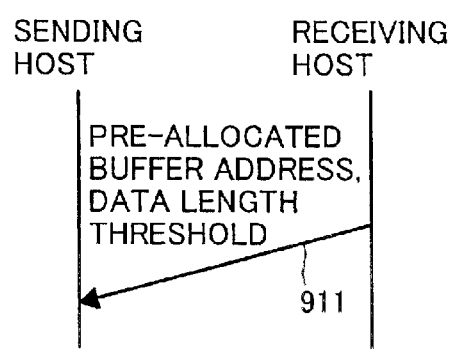
FIG. 6B is a communication flow chart useful in explaining the notification when starting the communication according to an embodiment of the present invention.

Conventionally, as shown in FIG. 6A, at the time or the communication start, data 910 containing the address and the buffer size of the pre-allocated buffer is sent. On the other hand, in the present embodiment, as shown in FIG. 6B, data 911 containing the above-mentioned transfer data length threshold, in addition to the buffer address and the buffer size of the pre-allocated buffer, is transferred at the time of the communication start. As for another possible timing when transferring the transfer data length threshold, there is the point in time when the host 20 performs communication with the host 20 for the first time.

As for the setting of the threshold of the transfer data length which is used to determine which of communication methods is optimal, there are conceivable methods such as (1) setting from the application 206, (2) setting from a manager or a user of the hosts 10 and 20, (3) setting from the program which installs the emulation library 140 or 150 in the host 10 or 20. However, the present invention is not limited to the above methods.

The sending operation using the transfer data length threshold is as follows. The sending host 10, when sending the data, sends this data to the pre-allocated buffer 252 of the receiving host 20 if the data length is less than or equal to the threshold. On the other hand, if the data length exceeds the transfer data length threshold, the sending host 10 sends the data to the application data 208 of the receiving host 20.

The invention described above improves the performance of the data reception processing at the receiving host 20 (and as a result, the overall system performance).

<<Method of Solving Second Problem>>

Figure 7:
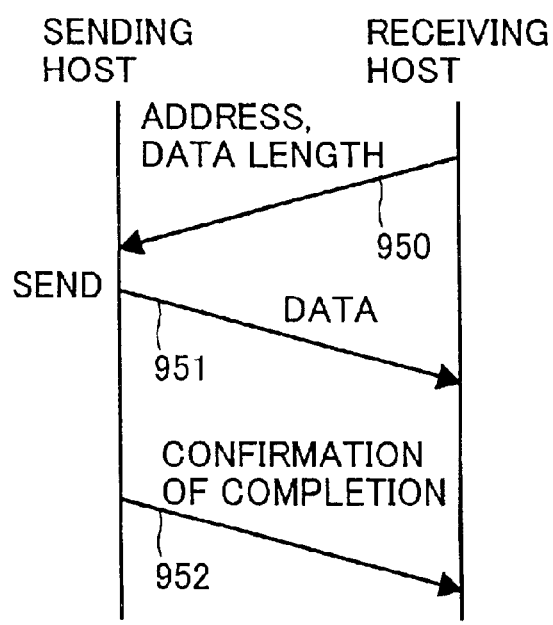
FIG. 7 is a communication flow chart useful in explaining another embodiment of the present invention.

For the description of a method of solving the second problem, first of all, the prior art will be described below. The prior art is shown in FIG. 7. When the application 206 of the receiving host 20 makes a reception call, and the emulation library 250 decides that the direct reception in the application data 208 is efficient, the emulation library registers the data 208 (805) and notifies the sending side of both of the reception address and the data length (indicated by the arrow 950) (the emulation library 140, 150 or 250 exchanges control messages in addition to data transfers, and it transfers this notification of the address and the data length in the form of a control message). In this case, when making a sending call, the sending host 10 transfers the data to this address (indicated by the arrow 951), and sends a confirmation message 952 of the completion of the sending. For this reason, right after having made the sending call, it is possible to start the sending. However, as described hereinabove, if the sending host 10 receives the notification 950 of the address after having performed the sending, this notification 950 is of no use, becoming processing overhead, occupying the network bandwidth, and reducing the processing performance of the overall system is reduced.

Above, the prior art has been described. In order to solve the above-mentioned problem, according to the present invention, the receiving host 20 calculates the efficiency of the notifications 950 of the address, and when this efficiency is low, suppresses these notifications. This effiency can be calculated in the form of the ratio of the number of times in which the data is received in the address given in the notifications 950 to the number of times of sending the notifications 950. Then, when the efficiency is lower than a certain threshold, the sending of the notifications 950 of the addresses is suppressed.

For the above-mentioned method, first of all, it is conceivable that a user or a manager, the author of the emulation library 140, 150, 250 or its installation program, or the application 200 sets the threshold. In addition, there are two methods that are conceivable, i.e., the method of collecting the notification 950 of all of the addresses to calculate the efficiency, and the method of calculating separately the efficiency for each reception address (in the case of the latter, only for reception addresses having low efficiency the notification 950 of the address is suppressed). Then, as for the suppressing operation, stopping (i.e., not continuing) and temporary interruption (i.e., continuing after a period of time) are conceivable.

The present invention described above enchances the processing efficiency of both of the sending host 10 and the receiving host 20 and reduces the network bandwidth uselessly occupied, thus enchances the performance of these hosts (and as a result, of the overall system).

<<Method of Solving Third Problem>>

First of all, the communication method according to the prior art will be described below. Hence forth, each of the combinations will be specified by adding to the reference numerals that specify the sending and receiving places (900, 904, etc.) a suffix that shows if the data transfer; done by writing data from the sending host ("write") or by reading data from the receiving host ("read"). For example, MPI-Pro described previously and shown in FIG. 5 uses only two combinations: 900-write and 904-write.

Figure 8:
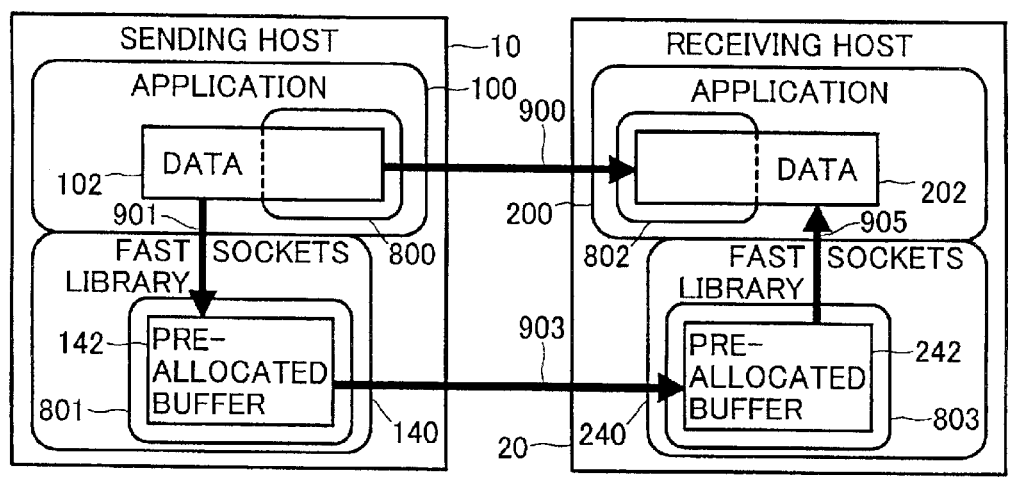
FIG. 8 is a block diagram useful in explaining the communication method of Winsock Direct.
Figure 9:
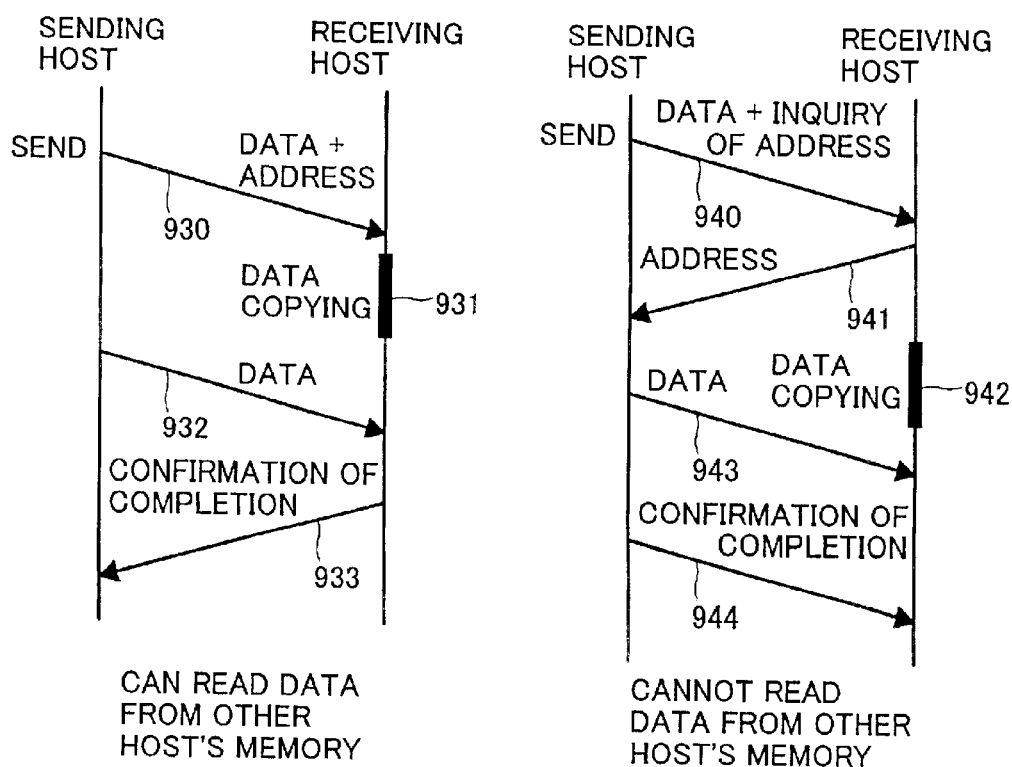
FIG. 9A and FIG. 9B are communication flow charts useful in explaining the details of the protocol of Winsock Direct.

The communication method of Winsock Direct is shown in FIG. 8, and the details of the protocol are shown in FIG. 9A and FIG. 9B. In Winsock Direct, first of all, the sending host 10 sends the data between the pre-allocated buffers 142 and 242 (indicated by arrows 930 and 940)(the combination is 903-write). The receiving host 20 copies the received data to the data 202 of the application 200 (indicated by 905, 931 and 942). When the data length is long, only an initial portion of the data is sent, and the remaining data 102 is registered (800) and the address of this data is added to the above-mentioned sending 940 or 930. The receiving host registers the data 202 (802). When the high-speed communication hardware 12 has a function to read memory by the receiving host 20, the receiving host 20 reads out the communication data (this is indicated by the arrow 932, and the combination is 900-read). On the other hand, when the high-speed communication hardware 12 does not have thus function to read memory by the receiving host, the receiving host reports the head address of the reception area (indicated by the arrow 941), and the sending host 10 writes the data (it is indicated by the arrow 943, and the combination is 900-write). Thereafter, the host which has carried out the communication finally sends a transfer completion confirmation (indicated by arrows 933 and 944). Then, both hosts 10 and 20 release the memory registration (800 and 802).

Figure 10:
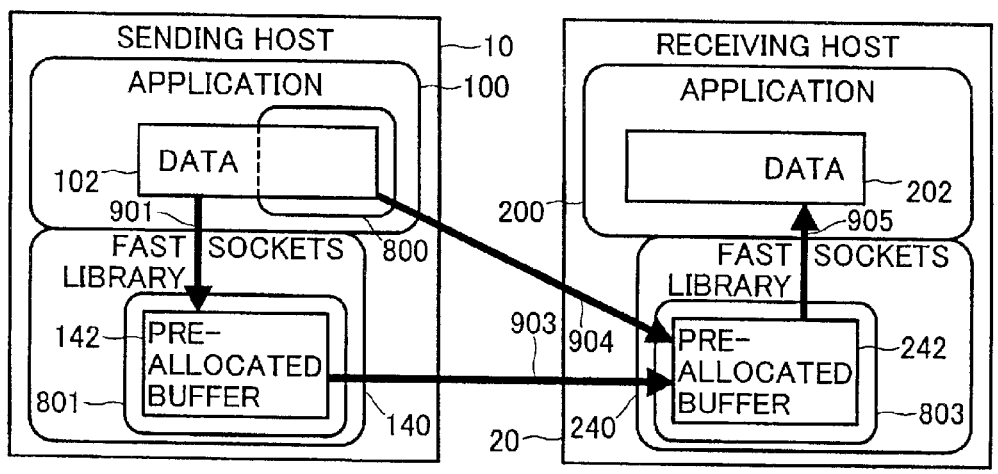
FIG. 10 is a block diagram useful in explaining the communication method used by Shah et al.

The communication method according to the system of Shah et al. is shown in FIG. 10. When the data length is short, the sending host 10 sends the data between the pre-allocated buffers 142 and 242 (903-write). On the other hand, when the data length is long, the data 102 is registered (800) to send the data thus registered to the pre-allocated buffer 242 of the receiving host (904-write).

Figure 11:
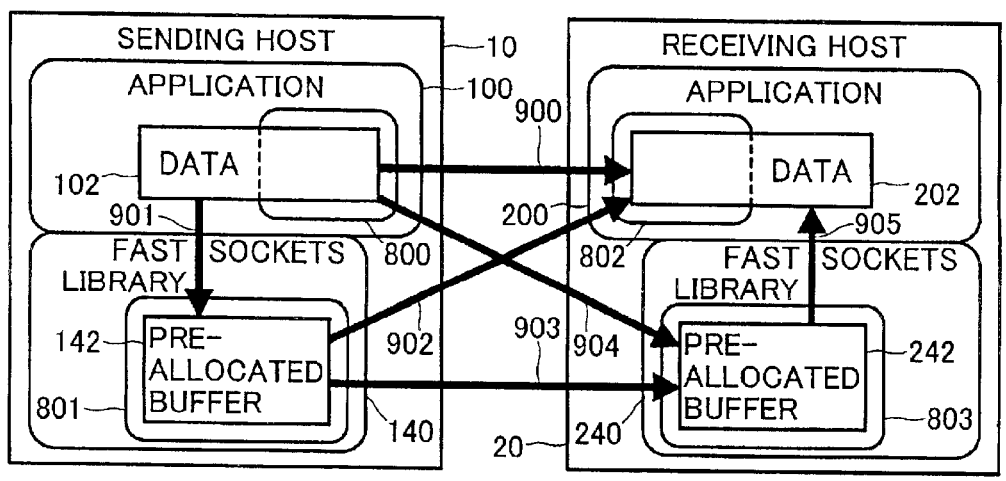
FIG. 11 is a block diagram useful in explaining a communication method according to still another embodiment of the present invention.

Above, the prior art has been described. The present invention, as shown in FIG. 11, uses a protocol which makes all eight combinations available. In particular, this protocol makes possible the combinations 902-read, 902-write, 903-read and 904-read which are not found in prior art.

Figure 12:
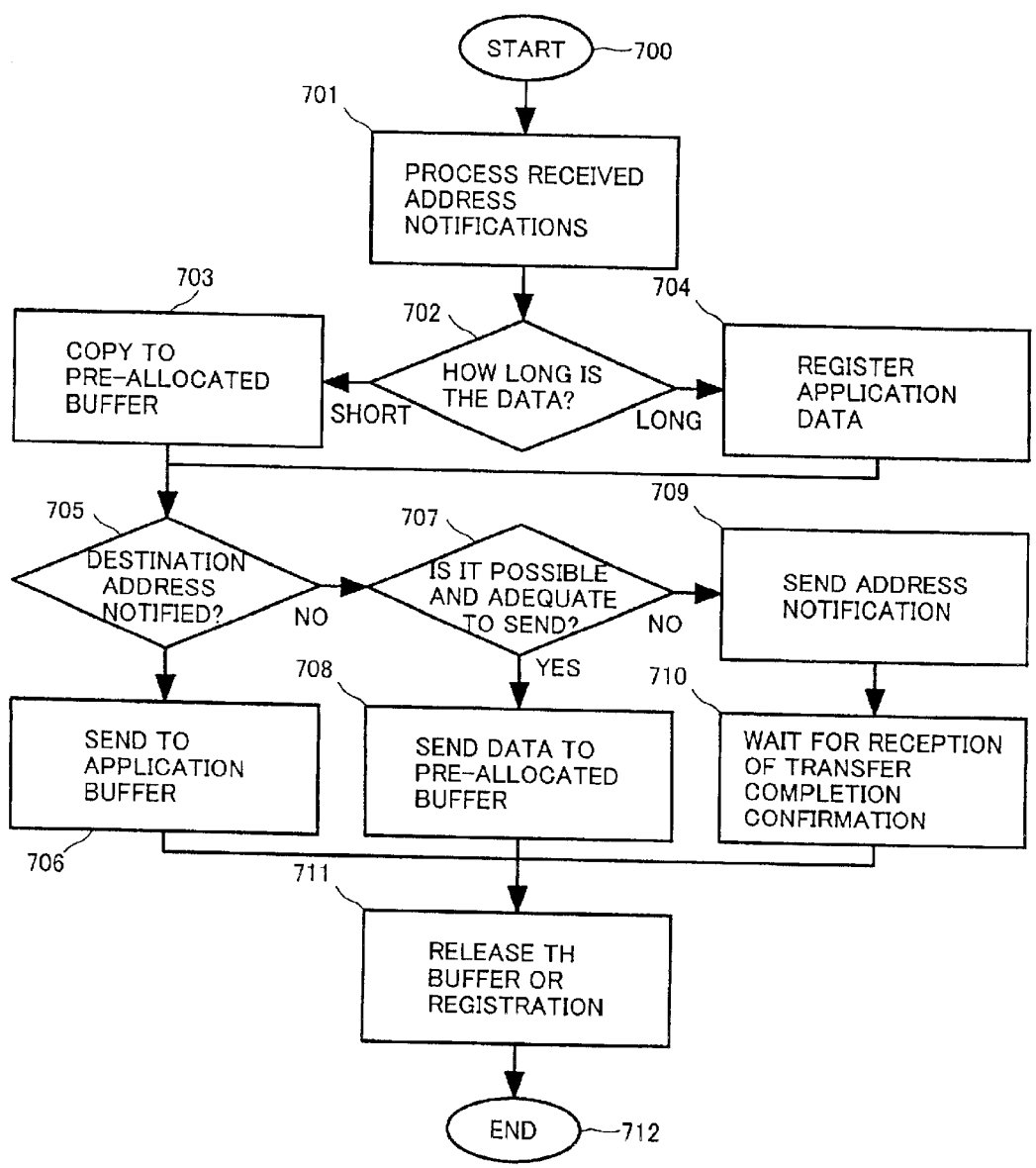
FIG. 12 is a flow chart useful in explaining the communication algorithm on the sending side according to yet another embodiment of the present invention.

The communication method of the present invention will be described below. The algorithm on the sending host 10 is shown in FIG. 12. First of all, if any address notification messages were received, then these messages are processed (Step 701). Then, the data length of the data to be sent 102 or 108 is checked (Step 702). If the data length is long, then the memory is registered (800 or 808) (Step 704). On the other hand, if the data length is short, then the data is copied to the pre-allocated buffer 142 or 152 (Step 703).

Next, if there is a destination address in the receiving host 20 which has been notified in the form of an address notification message (Step 705), then the data to be sent is written to the application data 202 or 208 of the receiving host 20 (Step 706) (when the data length is long, the combination is 900-write, while when the data length is short, the combination is 902-write). On the other hand, if there is no destination address, it is checked whether or not sending data to the pre-allocated buffer 242 or 252 of the receiving host 20 is possible (i.e., whether or not an empty area is present in this pre-allocated buffer) and also is adequate (as described in the first problem, whether or not the receiving host 20 wants to receive the data having such a length in the pre-allocated buffer 242 or 252) (Step 707). If both conditions are true in Step 707, then the sending host 10 writes the data into the pre-allocated buffer 242 or 252 (Step 708) (when the data length is long, the combination is 904-write, while when the data length is short, the combination is 903-write). On the other hand, if in Step 707 one of the two conditions is not true, the sending host 10 sends an address notification with the address of the data to be sent (Step 709) and waits for a reception completion message (Step 710) (when the data length is long, the combination is one of 900-read and 904-read, while when the data length is short, the combination is one of 902-read and 903-read). Finally, the sending data is released (Step 711) (when the data length is long, the registration 800 or 808 is released, while when the data length is short, the pre-allocated buffer 142 or 152 is treed).

Figure 13:
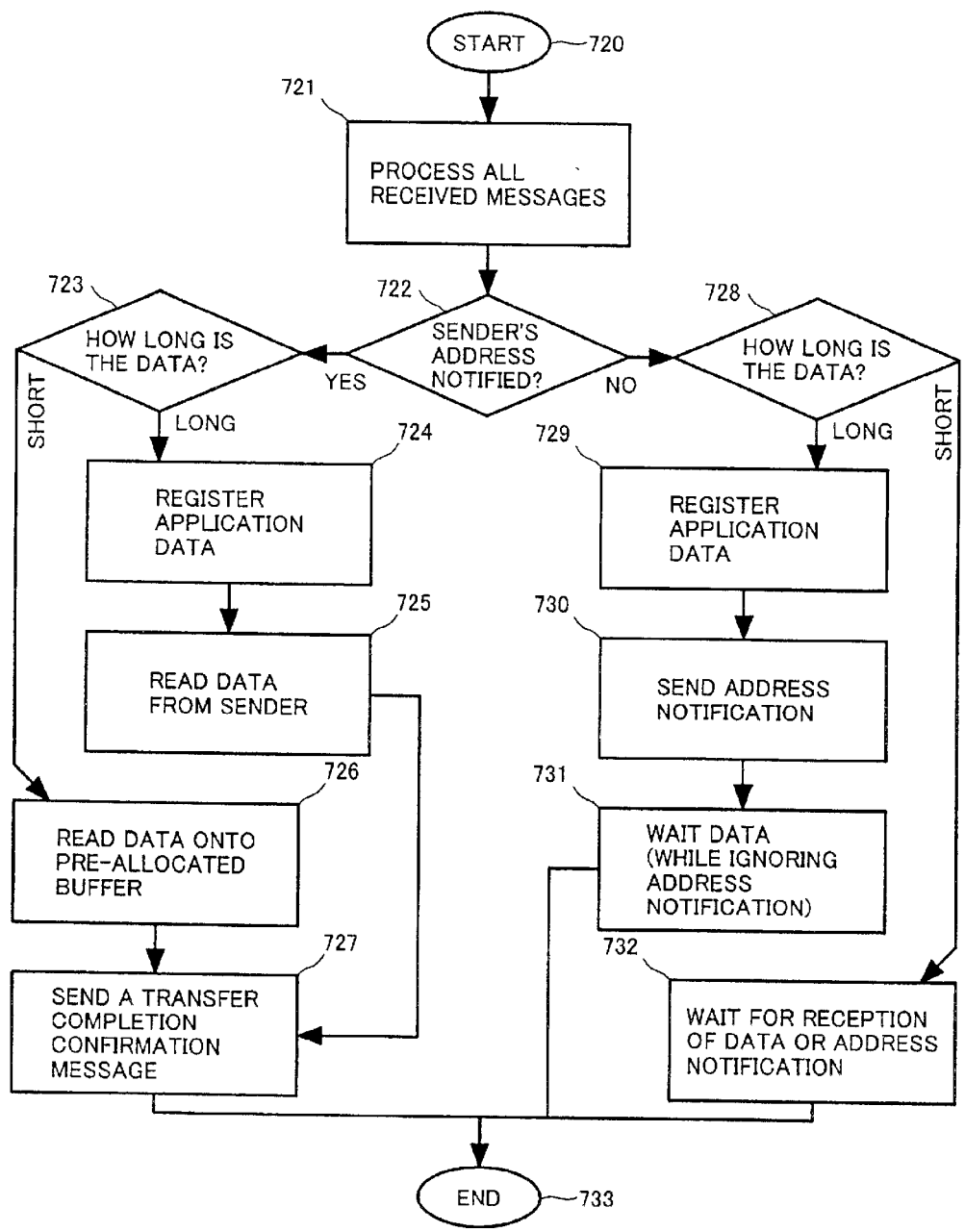
FIG. 13 is a flow chart useful in explaining the communication algorithm on the receiving side according to the yet another embodiment of the present invention.

The algorithm on the receiving side is shown in FIG. 13. First of all, the receiving host copies the data which has been received in the pre-allocated buffer 242 or 252 (indicated by the arrow 905 in FIG. 11) and checks whether or not there is an address notification message (Step 721). If there is an address notification message (Step 722), then the data length is checked (Step 723). If this data length is long, then the application data 202 or 208 is registered (802 or 805) (Step 724) to read out the data from the sending host 10 (Step 725)(in this case, the combination is one of 900-read and 902-read). On the other hand, if the data length is short, the receiving host 20 reads out the data onto the pre-allocated buffer 242 or 252 (Step 726) (in this case, the combination becomes one of 903-read and 904-read). Finally, a reception completion message is sent irrespective of the data length (Step 727).

If there were no address notification messages (Step 722), then the data length is checked (Step 728). If this data length is short, in step 732 the receiving host 20 waits for either a data reception in the pre-allocated buffer 242 or 252 (903-write or 904-write) or an address notification message (in the latter case, the processing in FIG. 13 is repeated from START 720). On the other hand, if the data length is long, then the data of the application is registered (Step 729), and its address(es) is (are) sent in the form of address notification message(s) (Step 730). In the sending host 10, if that address notification message is received before starting the sending processing, then the communication combination is of one of 900-write and 902-write. On the other hand, if the receiving host 20 receives an address notification message in this step, then it is understood that the sending host 20 and the receiving host 20 have sent address notification messages to each other at the same time. In this case, in order that the sending host 10 send the data, the receiving host 20 disregards the address notification message it received for this data transfer.

The invention described above improves the performance of the communication between the sending host 10 and the receiving host 20, thus also improving the performance of these hosts (and as a result, of the overall system).

<<Method of Solving Fourth Problem>>

It is conceivable that in hosts 10 and 20 that are storage apparatuses have only one of the application data 102, 202, 108 or 208, or the pre-allocated buffer 142, 152, 242 or 252. The communication algorithm which was described in the method of solving the third problem can be used in this case as well. When a certain host 10 or 20 does not have application data 102, 108, 202 or 208, the judgements 702, 723 and 728 on the processing of the host 10 or 20 are made "short" at all times. Conversely, when a certain host 10 or 20 does not have pre-allocated buffers 142, 242, 152 or 252, these judgements on this host are made "long" at all times. Then, at the time of the communication start, the pre-allocated buffer address shown in FIG. 6A is not sent from that host, and also on the other endpoint of the communication, the condition "PRE-ALLOCATED BUFFER EXISTS?" is added to the conditions of "IS IT POSSIBLE AND ADEQUATE TO SEND?" in judgement 707. For this reason, the implementation of the functions which are not required becomes unnecessary, and when there is no pre-allocated buffer 142, 242, 152 or 252, the allocation of its memory region becomes unnecessary. Thus, this algorithm makes possible a simple implementation and also to save resources. However, there is a problem which is described below.

When a host and a storage apparatus communicate with each other using the above-mentioned algorithm, the storage apparatus does not allocate unnecessary resources (such as the pre-allocated buffer 142, 242, 152 or 252). On the other hand, since the host side does not know the characteristics of the communication, for example, even when the data transfer unit length is always long, the host side allocates the pre-allocated buffer 142, 242, 152 or 252, and hence its memory is wasted.

In the present invention, in order to solve the above-mentioned problem, the initialization of the library at the communication start is dove according to the transfer data length which is expected in this communication. This transfer data length is reported to the other party of the communication and/or is specified by the application 100, 200, 106 or 206. It can be judged depending on if this transfer data length is "long" or "short" whether or not the sending and receiving of the data at the application is required, or a pre-allocated buffer 142, 242, 152 or 252 is required.

The invention described above improves the performance of the communication between the hosts 10 and 20, saves memory, and improves the performance of these hosts (and as a result, of the overall system). In addition, since the system has only to be equipped with the processing performance and the memory amount which are required for the hosts 10 and 20, the cost of the system can be reduced.

<<Method of Solving Fifth Problem>>

Next, the method of solving the fifth problem according to the present invention will be described below. First of all, there are three kinds of changes of the pre-allocated buffer, i.e., (1) changing the size, i.e., enlargement or reduction, (2) addition or deletion, and (3) intended use change, i.e., to change a receive buffer into a send buffer, or Vice-versa.

It is conceivable that the hosts 10 or 20 determine the changes on the basis of the following operation. First of all, when initializing the emulation library 140, 150, 240 or 250, the maximum value and the minimum value of the size, and the values of the upper limit and the lower limit of the utilization rate are set. As for the method of setting these values, there are conceivable methods such as setting the constants when creating the library 140 or 150, (2) setting by a user or a manager of the hosts 10 and 20 or the application. And (3) the setting by the program which installs the library 140, 150, or 240, 250 in the host 10 or 20 (however, the present invention is not limited to these methods). Then, after having started the communication, the utilization rate of the pre-allocated send buffer 142 or 152 and the pre-allocated receive buffer 242 or 252 is checked at every send/receive operation or periodically to calculate the mean utilization rate. When the mean utilization rate exceeds the upper limit, and also the size of the pre-allocated buffer 142, 242, 152 or 252 does not exceed the maximum, the enlargement of the buffer or the addition of buffers is done. Conversely, when the mean utilization rate falls below the lower limit, and also the size of the pre-allocated buffer 142, 242, 152 or 252 is not below the minimum, the reduction of the buffer size or the deletion of buffers is done. In case a certain change has been determined for the send buffer, and the reverse change has been determined for the receive buffer, the intended use of the buffer is changed (and vice versa). For example, when the pre-allocated send buffer 142 or 152 is to be enlarged, while the pre-allocated receive buffer 242 or 252 is to be reduced, it is conceivable that a part of the receive buffer is turned into a send buffer.

When the pre-allocated buffer 242, 252 in the receiving host 20 is changed, it is necessary for the receiving host 20 to notify the sending host of this change in the form of a control message (conversely, it is unnecessary to notify the receiving host 20 of a change of the pre-allocated send buffer 142, 152 on the sending host 10). In the case of a change notification message about size reduction, buffer deletion or intended use change, in order to prevent the sending host to send data to the region to be changed, the receiving host 20 sends the change notification message and only performs the change after the sending host acknowledges this message. Changes other than these ones are can be done even before sending out the notification message, and also an acknowledgement by the sending host is unnecessary.

The invention described above improves the performance of the communication between the hosts 10 and 20 and also saves memory, thus it improves the performance of these hosts (and as a result, of the overall system). In addition, since the system has only to be equipped with the memory quantity required for the hosts 10 and 20, this invention reduces the cost of the system.

<<Changes>>

It should be understood that the present invention is not intended to be limited to the preferred embodiments which have already been described and to changes to them, but can be realized by the changes which will be exemplified below or by other changes.

(1) In the description above, when the data 102, 202, 108, 208 is registered (800, 802, 805, 806) to perform data transfer, the registration is released right after the completion of the transfer. However, similarly to MPI-Pro, in order to make registration unnecessary when data at the same address is transferred again, it is possible to cache the registrations instead of releasing them right after data transfer completion.

(2) While in the description of the algorithms and the protocols communication completion messages are shown, the functionality of the high-speed communication hardware 12 and for the communication protocol may make all or some of these messages unnecessary.

(3) The methods of solving the above-mentioned five problems can be used separately, or else a plurality of these methods can be used simultaneously in combination.

The program(s) for implementing the present invention can be stored in a program storage medium of a disc storage device or similar device, and sold independently or in combination with other program(s). In addition, the program (s) for realizing the present invention may be implemented in the form of a program to be added to one or more communication program(s) which has(have) already been in use, or in the form of program(s) to replace part of this/those communication program(s).

As apparent from the foregoing, the present invention realizes high-speed communication and also reduces the processing overhead and the quantity of memory used.

While the present invention has been particularly shown and described with reference to the preferred embodiments and the specified changes thereof, it will be understood that the various modifications and other changes will occur to those skilled in the art without departing from the scope and true spirit of the invention. The scope of the invention is therefore to be determined solely by the appended claims.

What is claimed is:

1. A communication method in which data is transferred from a second data processing apparatus on the sending side to a first data processing apparatus on the receiving side through a communication means, and in which, to make possible sending data from or receiving data into a memory region, said memory region is registered in the said communication means before the sending or receiving of the said data:

wherein, in a specific data transfer which is part of a specific data exchange, before the start of said specific data exchange, said first data processing apparatus registers a first memory region which is used to temporarily store received data from another data processing apparatus, said received data being later copied to the memory region that is the final destination of the specific data transfer; and said first data processing apparatus communicates to said second data processing apparatus a transfer data length threshold, in accordance with which said second data processing apparatus selects one of a first transfer operation for transferring the data to said first memory region, which is already registered, and a second transfer operation that registers in said first data processing apparatus a second memory region which is the final destination of the specific data transfer and makes the second data processing apparatus transfer the said data to the said second memory region.

2. A communication method according to claim 1, wherein the report of the threshold is carried out concurrently with the report of the address(es) of said first memory region from said first data processing apparatus to said second data processing apparatus.

3. A communication method according to claim 1, wherein the report of the threshold is carried out at the time of the start of the communication between said first data processing apparatus and said second data processing apparatus.

4. A communication method according to claim 1, wherein the report of the threshold is carried out at the first time that said first data processing apparatus communicates with said second data processing apparatus.

5. A communication method in which data is transferred from a second data processing apparatus on the sending side to a first data processing apparatus on the receiving side through a communication means, and in which, to make possible sending data from or receiving data into a memory region, said memory region is registered in the said communication means before the sending or receiving of the said data:

wherein, in a specific data transfer which is part of a specific data exchange, before the specific data exchange, said first data processing apparatus previously registers a first memory region which is used to temporarily store received data from another data processing apparatus, said received data being later copied to the memory region that is the final destination of the specific data transfer;

said first data processing apparatus communicates to said second data processing apparatus a transfer data length threshold for the selection of the transfer operation; and when the length of the data to be transferred does not exceed the threshold, said second data processing apparatus sends the data with said first memory region, which has been registered, as the destination; and when the length of the data to be transferred exceeds the threshold, said second data processing apparatus request said first data processing apparatus to register a second memory region which is the final destination of the specific data transfer and sends the data with said second memory region as the destination.

6. A communication method in which data is transferred from a second data processing apparatus on the sending side to a first data processing apparatus on the receiving side through a communication means, and in which, to make possible sending data from or receiving data into a memory region, said a memory region is registered in said communication means before the sending or receiving of the data, wherein, in a specific data transfer in a specific data exchange, the data of the specific data transfer is copied to a first memory region, which is registered in said second data processing apparatus before the start of the specific data exchange;

said first data processing apparatus is notified of the address(es) and a data length(s) of the data thus copied; and said first data processing apparatus, after having received the notification of the address(es) and the data length (s), when the data length(s) exceed a predetermined specific threshold, registers a second memory region for the reception of the data and reads out the data which has been copied to said first memory region of said second data processing apparatus onto said second memory region thus registered, while when the data length does not exceed the threshold, reads out the data which has been copied to said first memory region of said second data processing apparatus onto a third memory region which is previously registered in said first data processing apparatus before the start of the specific data exchange.

7. A communication method in which a first data processing apparatus and a second data processing apparatus transfer data to each other through a communication means, and in which, to make possible sending data from or receiving data into a memory region, said memory region is registered in the said communication means before the sending or receiving of the said data, said method comprising the steps of:

optionally on said first and second data processing apparatus on a specific data transfer in a specific data exchange, temporarily storing data received from another data processing apparatus in a first memory region and copying this received data thus stored into the memory region that is the final destination of specific data transfer;

optionally on said first and second data processing apparatus on the said specific data transfer in a specific data exchange, copying the data of the specific data transfer to a second memory area and sending the copied data to the other party of the communication; and receiving a value of the transfer data length which is expected in the data exchange from the application at the source and/or destination of the communication, and/or from the other party of the communication.

8. A communication method according to claim 7, wherein when before the specific data exchange, said transfer data length is received and when the value of the said transfer data length is shorter than a predetermined value, said first and/or second memory region(s) is (are) allocated, registered and used.

9. A communication method according to claim 7, wherein when after having registered said first and/or second memory region(s), said transfer data length is received and when said transfer data length is equal to or longer than a predetermined value, the registration and the allocation of said first and/or second memory region(s) are released.

* * * * *